US007837447B2

(12) United States Patent
Mao et al.

(10) Patent No.: US 7,837,447 B2
(45) Date of Patent: Nov. 23, 2010

(54) DILUTER PUMP FOR CHEMISTRY ANALYZERS

(75) Inventors: Tony Mao, Natick, MA (US); Ronald Jones, Newton, NH (US); Stanley Liffmann, Newbury, MA (US)

(73) Assignee: Medica Corporation, Bedford, MA (US)

( * ) Notice: Subject to any disclaimer, the term of this patent is extended or adjusted under 35 U.S.C. 154(b) by 399 days.

(21) Appl. No.: 11/880,562

(22) Filed: Jul. 23, 2007

(65) Prior Publication Data

US 2009/0028727 A1 Jan. 29, 2009

(51) Int. Cl.

| | |
|---|---|
| ***F04B 49/06*** | (2006.01) |
| ***F04B 23/06*** | (2006.01) |
| ***F04B 7/00*** | (2006.01) |
| ***B65D 88/54*** | (2006.01) |
| ***G01F 11/28*** | (2006.01) |

(52) U.S. Cl. ........................... 417/53; 417/62; 417/415; 417/505; 417/539; 222/137; 222/333

(58) Field of Classification Search ................... 417/62, 417/521, 539, 53, 415, 505; 222/137, 333, 222/380

See application file for complete search history.

(56) References Cited

U.S. PATENT DOCUMENTS

| | | | | |
|---|---|---|---|---|
| 2,803,951 | A * | 8/1957 | Newton | 62/6 |
| 5,496,466 | A * | 3/1996 | Gray | 210/137 |
| 6,368,080 | B1 * | 4/2002 | Sipin | 417/415 |
| 7,470,402 | B2 | 12/2008 | Abou Saleh et al. | |
| 2005/0276705 | A1 * | 12/2005 | Pinkerton et al. | 417/415 |
| 2006/0008369 | A1 * | 1/2006 | Angove | 417/539 |
| 2006/0008372 | A1 * | 1/2006 | Angove | 417/566 |
| 2006/0083629 | A1 * | 4/2006 | Dinkel et al. | 417/273 |

* cited by examiner

*Primary Examiner*—Devon C Kramer
*Assistant Examiner*—Bryan Lettman
(74) *Attorney, Agent, or Firm*—Kristofer E. Elbing

(57) ABSTRACT

A chemistry analyzer precision pump is disclosed. In one general aspect, it has a pump block that defines a first pump chamber with a fluid port at a first end, an opening for a piston at a second end, and a seal mount located between the opening and the port. A second, smaller, pump chamber also has a fluid port at a first end, an opening for a piston at a second end, and a seal mount located between the opening and the port. A first seal is mounted at the first seal mount and a second seal is mounted at the second seal mount. A first piston is mounted to reciprocate in the first pump chamber, past the first seal, and a second, smaller piston is mounted to reciprocate in the second pump chamber, past the second seal. The first and second pistons and the first and second pump chambers can be conically shaped.

16 Claims, 6 Drawing Sheets

DILUTER PUMP FOR CHEMISTRY ANALYZERS

FIELD OF THE INVENTION

This invention pertains to diluter pumps for use in chemistry analyzers.

BACKGROUND OF THE INVENTION

Chemistry analyzers perform automated chemical analysis tasks on a sample, such as a blood sample. Many of these tasks require dilution fluid to achieve appropriate reagent concentrations. This fluid is usually supplied by a pump known as a diluter pump or diluter. One prior art design for a diluter uses two pistons of different diameters that move in a metal cylinders defined in a metal block. Each piston bears a seal to keep water in the pump's compression chambers.

Chemistry analyzers are very important health care tools. They can detect imbalances in a number of chemical species in bodily fluids, such as cholesterol, glucose, enzymes, iron, magnesium, protein, uric acid, chlorine, lithium, potassium, or sodium. This information can help to diagnose a variety of conditions, such as high cholesterol, abnormal liver function, or diabetes, to name only a few. Improvements to the quality of measurements performed by chemistry analyzers could therefore have a positive effect on the care of a very large number of patients.

A chemistry analyzer is also a relatively expensive item for a health care provider, such as a hospital, and this cost is usually passed on to health care consumers. The cost passed on to consumers can be affected by the initial cost of the analyzer, the cost of reagents and reaction vessels, and the cost of maintaining and servicing the analyzer. Improvements that lead to a reduction in cost of chemistry analyzers and their maintenance could therefore have a positive effect on the overall cost of health care. And the overall health care savings resulting from even a relatively small reduction in the costs associated with an analyzer could be substantial in view of the large number of patients served by these analyzers.

The cost savings could also help make the technology available to more patients, as well. In developing countries and remote or less affluent regions of developed countries, cost may prevent health care providers from having easy access to a chemistry analyzer. They might thus need to send samples to remote facilities, recommend that patients travel to those facilities, or even diagnose conditions without the benefits of automated chemical analysis. Improvements that lead to a reduced cost of chemistry analyzers and their maintenance could therefore have a significant effect on the availability of health care as well as the promptness and efficiency with which it can be delivered.

SUMMARY OF THE INVENTION

In one general aspect, the invention features a chemistry analyzer precision pump with a pump block that defines a first pump chamber with a fluid port at a first end, an opening for a piston at a second end, and a seal mount located between the opening and the port. A second, smaller, pump chamber has a fluid port at a first end, an opening for a piston at a second end, and a seal mount located between the opening and the port. A first seal is mounted at the first seal mount and a second seal is mounted at the second seal mount. A first piston is mounted to reciprocate in the first pump chamber, past the first seal, and a second, smaller piston is mounted to reciprocate in the second pump chamber, past the second seal.

In preferred embodiments, the first and second seals include a flouropolymer, such as polytetrafluoroethylene. The first and second seals can each include a first spring positioned to bias them against their respective pistons. The first and second springs can be circular. The first seal mount can be defined at least in part by a portion of the pump block in the first pump chamber and centered around a longitudinal axis of the first pump chamber proximate its piston opening, with the second seal mount being defined at least in part by a portion of the pump block in the second pump chamber and centered around a longitudinal axis of the second pump chamber proximate its piston opening. The first and second seals can be O-ring seals. The first and second pump chambers can be parallel chambers defined in the pump block. The pump block can be made of plastic, with the pump chambers being defined by machined bores in the plastic pump block. The pump block can be made of polycarbonate or acrylonitrile butadiene styrene. The pump block can be at least partially transparent to visible light. The pump can further include a linear drive mechanism coupled to both the first and second pistons. The linear drive mechanism 24A can include a stepper motor 24 and a lead screw 22. The first and second pistons can be made of a ceramic material. The first piston can have a conical head defined by a first conic surface, with the first pump chamber having a conical head defined by a third conic surface that has an aperture that is substantially the same as an aperture of the first conic surface, whereby the conical head of the first piston mates with the conical head of the first pump chamber at the top of its stroke, and the second piston can have a conical head defined by a second conic surface, with the second pump chamber having a conical head defined by a fourth conic surface that has an aperture that is substantially the same as an aperture of the second conic surface, whereby the conical head of the second piston mates with the conical head of the second pump chamber at the top of its stroke. The first pump chamber can include a first bushing mount area, with a first bushing mounted in the first bushing mount area to constrain motion of the first piston, and the second pump chamber can include a second bushing mount area, with a second bushing mounted in the second bushing mount area to constrain motion of the second piston. The pistons can have portions with different cross sections at different distances from their heads, with an outer surface of a first of these portions interacting with a working surface of a respective bushing and an outer surface of a second of these portions interacting with a respective seal. A bore of the first pump chamber can be related to a bore of the second chamber by a ratio of about 4:1. A first intake two-way valve and a first outlet two-way valve can be hydraulically connected to the first chamber and a second intake two-way valve and a second outlet two-way valve can be hydraulically connected to the second chamber.

In another general aspect, the invention features a chemistry analyzer precision pumping method that includes driving a first piston through a first pump chamber, driving a second piston through a second pump chamber, wherein the first piston has a larger diameter than the second piston and wherein the first pump chamber has a larger diameter than the second pump chamber, holding a first seal between the first piston and an outer wall of the first pump chamber at a first seal mounting location, and holding a second seal between the second piston and an outer wall of the second pump chamber at a second seal mounting location.

In a further general aspect, the invention features a chemistry analyzer precision pump, including means defining a first pump chamber and a second pump chamber that has a smaller capacity than does the first pump chamber, means for displacing fluid in the first pump chamber, means for displacing fluid in the second pump chamber, first sealing means, second sealing means, means for holding the first sealing means between the first means for displacing and a surface of the first pump chamber at a first mounting location in the first pump chamber, and means for holding the second sealing means between the second means for displacing and a surface of the second pump chamber at a second seal mounting location in the second pump chamber.

In another general aspect, the invention features a chemistry analyzer precision pump that includes a first pump chamber having a fluid port at a first end, and an opening for a piston at a second end, with the first pump chamber including a first head tapered from the first end to the second end. A second pump chamber has a fluid port at a first end, and an opening for a piston at a second end, with the second pump chamber including a second head tapered from the first end to the second end of the second pump chamber. A first piston is mounted to reciprocate in the first pump chamber and has a first tapered piston head, and at least a portion of the first tapered piston head has a taper portion that matches at least a portion of the first tapered pump chamber head, such that the first tapered piston head portion mates with the first tapered pump chamber head portion at the top of its stroke. A second piston is mounted to reciprocate in the second pump chamber and has a second tapered piston head, and at least a portion of the second tapered piston head of the second piston has a second taper portion that matches at least a portion of the second tapered pump chamber head, such that the second tapered piston head portion mates with the second tapered pump chamber head portion at the top of its stroke.

In preferred embodiments, the first and second pumps can be made of a ceramic material. The first and second pistons and the first and second pump chambers all have a circular right conical shape. The first and second pump chambers can have different bores, with the first and second pistons having different diameters. The tapered cross-section of the pistons in diluter pumps according to the invention can improve the precision and accuracy with which diluter fluid is dispensed in a chemistry analyzer. This can lead to more accurate and/or precise readings. It may also allow an analyzer to be used with reagents having less precise concentrations, which may reduce their cost.

The pump blocks of the diluter pumps according to the invention can also be built less expensively because of looser tolerances for the cylinder bores and the use of seals in the cylinders instead of on the pistons. This can, in turn, reduce the cost of the chemistry analyzer.

DESCRIPTION OF AN ILLUSTRATIVE EMBODIMENT

Figure 1:
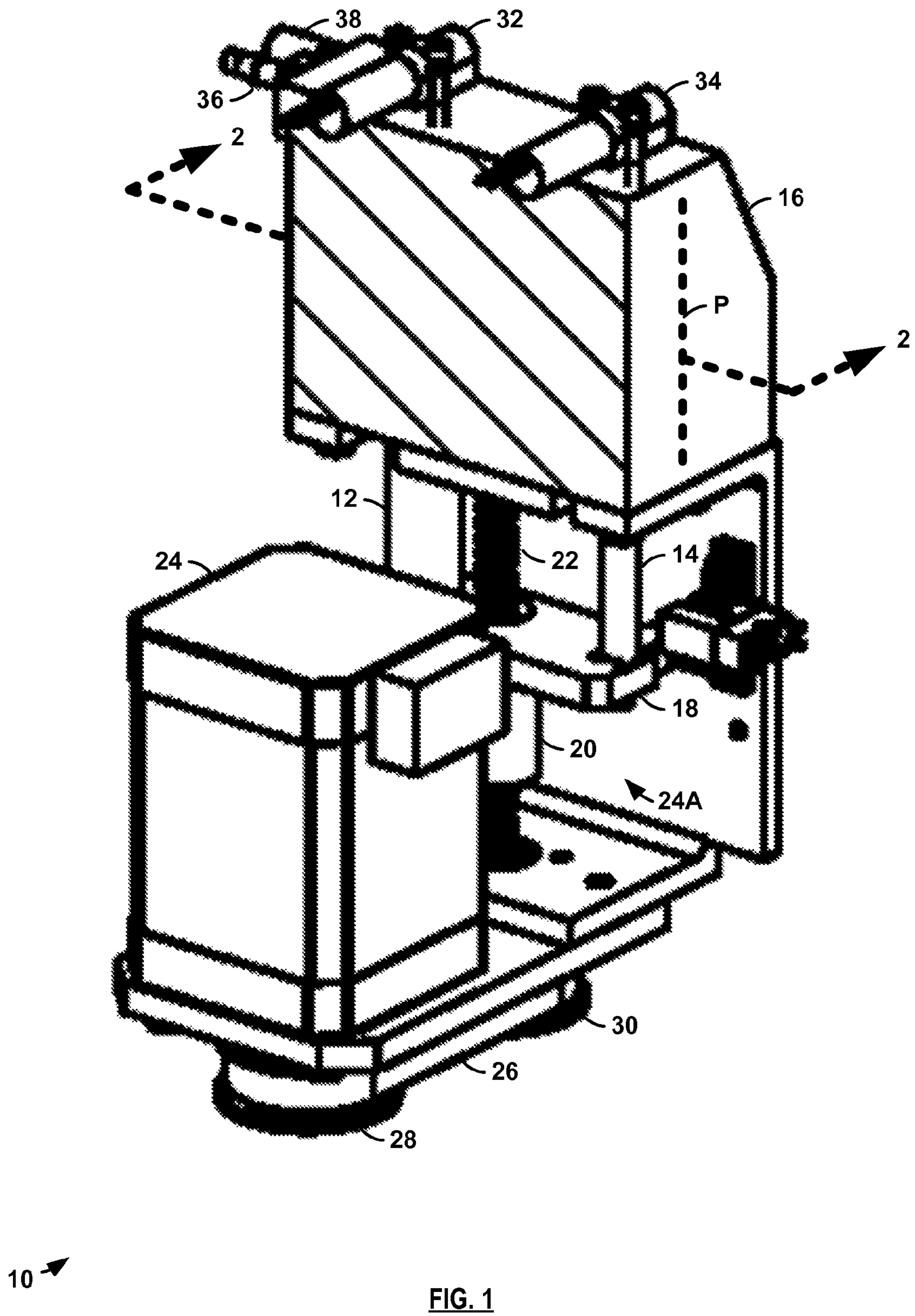
FIG. 1 is a perspective view of an illustrative embodiment of a diluter pump according to the invention.

Referring to FIG. 1, an illustrative diluter pump 10 includes a larger piston 12 slidably positioned in a larger bore of a pump block 16 and a smaller piston 14 slidably positioned in a smaller bore of the pump block. The pistons are preferably moved together along parallel paths in their respective cylinders by an actuation mechanism. In the present embodiment, the actuation mechanism includes a carriage 18 that connects the proximal ends (tails) of the pistons to a lead screw nut 20 that is positioned to ride on a lead screw 22. A stepper motor 24 is positioned to drive the lead screw via a toothed belt 26 and two pulleys 28, 30. Other actuation methods, such as mechanisms involving cams or linkages, might also be appropriate in certain circumstances.

Figure 2:
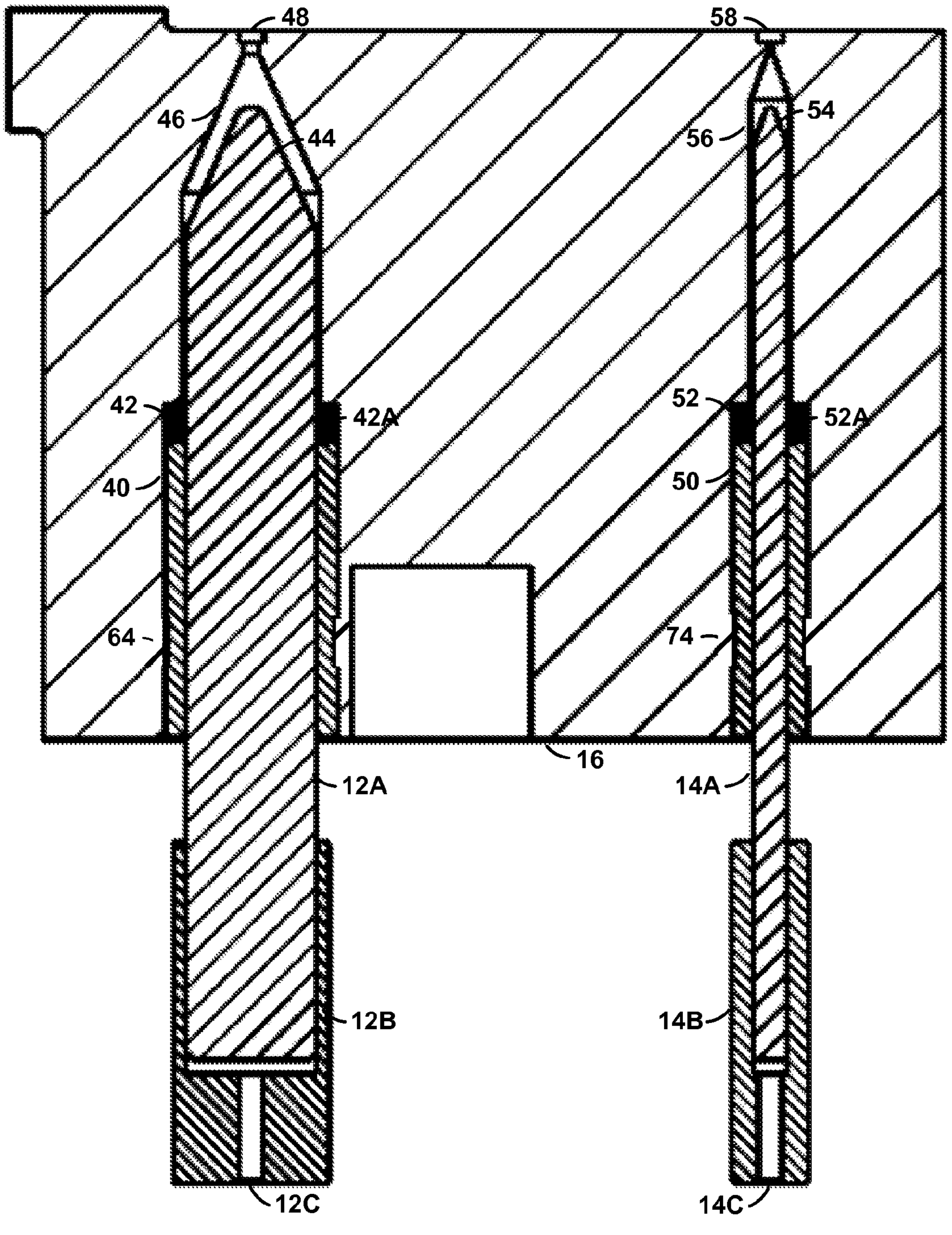
FIG. 2 is a cross-sectional view of the pump block of the diluter pump of FIG. 1 taken at plane P and viewed in the direction 2-2 shown in FIG. 1.

Referring also to FIG. 2, a larger bushing 40 is mounted within a widened region below the larger bore of the pump block to guide the larger piston 12. Similarly, a smaller bushing 50 is mounted within a widened region below the smaller bore of the pump block to guide the smaller piston 14. A larger seal 42 is mounted above the larger bushing to seal a larger conical compression chamber 46 defined above the distal end of the larger piston. Similarly, a smaller seal 52 is mounted above the smaller bushing to seal a smaller conical compression chamber 56 defined above the distal end of the smaller piston. The seals are each held in place between the bushings and a top ridge of the widenend regions below the bores. The seals 42, 52 can each include a spring 42A, 52A positioned to bias them against their respective pistons 12, 14.

The distal ends 44, 54 (heads) of the pistons 12, 14 preferably each have a conical cross-section. This cross-section is designed to closely match the conical cross-section of the compression chambers 46, 56. The use of these cooperating cross-sections tends to discourage the formation of bubbles in the dilution fluid, allowing the pump to dispense it more precisely. Note that while the presently preferred embodiment employs a right circular cone (i.e., a cone that has its apex aligned directly above the center of its circular base), other tapered shapes, such as hemispheres, oval right cones, oblique cones, or otherwise distorted cones, might also be used in some situations.

A first fluid outlet 48 is located at the peak of the larger conical compression chamber 46 and a second fluid outlet 58 is located at the peak of the smaller conical compression chamber 56. A first three-way solenoid valve 32 has a common port hydraulically connected to the first fluid outlet 48, and a second three-way solenoid valve 34 has a common port hydraulically connected to the second fluid outlet 58. Each of the valves has a normally (open) port hydraulically connected to a pump fluid inlet 36 and a normally (closed) port hydraulically connected to a pump outlet 38. In this embodiment, the valves are connected to the pump's inlet and outlet via inlet and outlet channels defined by the pump block. Suitable solenoid valves are available from the Lee Company, of Essex Conn. (e.g., part number LHDA2421111H).

Referring also to FIG. 2, the pistons 12, 14 can be made of ceramic plungers 12A, 14A with their tails shrink fit into respective stainless steel cup-shaped collars 12B, 14B. These collars each have tapped mounting holes 12C, 14C centered on the respective longitudinal axes of the pistons. Suitable pistons are available, for example, from Ceramaret SA, of Bôle, Switzerland, and illustrative dimensions (in inches) for the plungers are shown in Table 1.

TABLE 1

Figure 3:
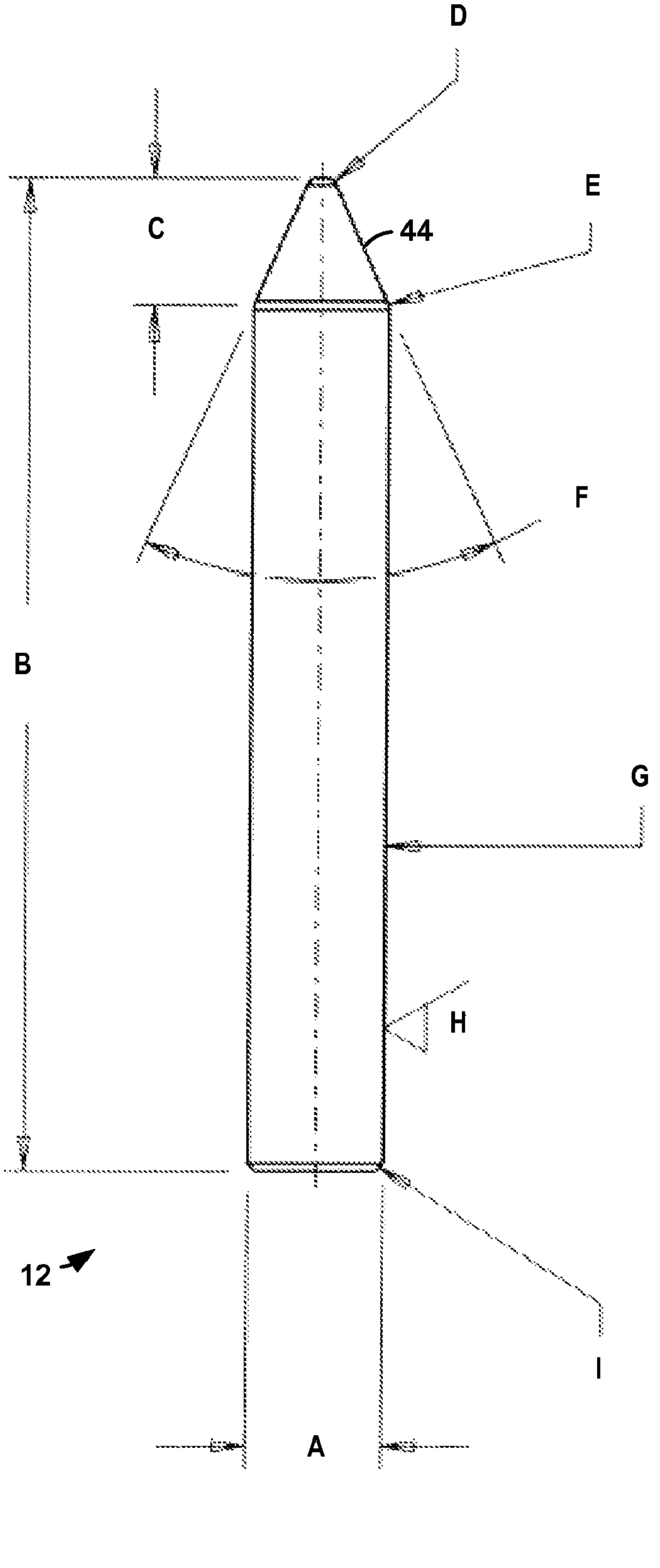
FIG. 3 is an elevation view of a larger piston for the diluter pump of FIG. 1 showing, with dimensions.

| | Larger Piston (FIG. 3) | | Smaller Piston (Not shown) | |
|---|---|---|---|---|
| Dimension | Value | Tolerance | Value | Tolerance |
| A (diameter) | 0.3750 | +/−0.0001 | 0.0940 | +/−0.0001 |
| B (length) | 2.75 | +/−0.01 | 2.75 | +/−0.01 |
| C (head height) | 0.35 | +/−0.01 | 0.01 | +/−0.01 |
| D (radius) | 0.03 | +/−0.01 | N/A | |
| E (radius) | 0.06 | +/−0.01 | 0.03 | +/−0.01 |
| F (head angle) | 48° | +/−0.5° | 40° | +/−0.5° |
| G (straightness) | 0.001 | +/−0.001 | 0.001 | +/−0.001 |
| H (roughness) | 0.000004 | | 0.000004 | |
| I (chamfer) | 45° × 0.02 | | 45° × .005 | |

Figure 4:
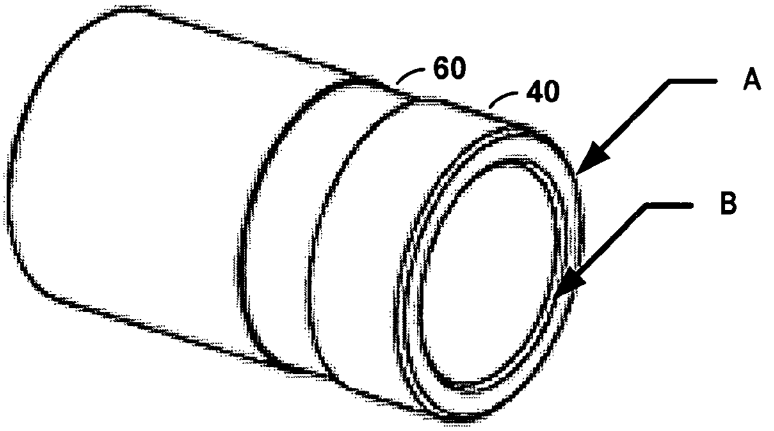
FIG. 4 is a perspective view of a larger bushing for the diluter pump of FIG. 1.
Figure 5:
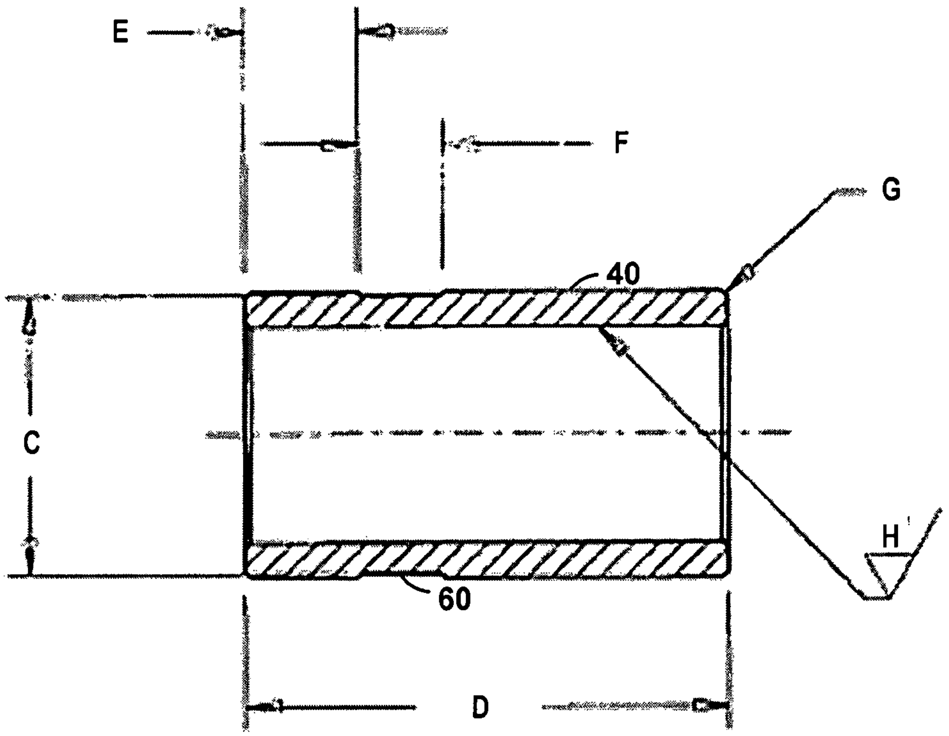
FIG. 5 is a cross-section of the bushing shown in FIG. 4, taken at a plane that passes through the central longitudinal axis of the bushing.

Referring to FIGS. 2, 4 and 5, the bushings 40, 50 are cylindrical with a circumferential notch (60, see FIGS. 4 and 5) that interfaces with cylindrical ridges 64, 74 at the lower end of the cylinders to hold them in place. The bushings are preferably made of a flouropolymer, such as polytetrafluoroethylene, which is available from DuPont under the Teflon® trademark. A suitable source for the bushings is Jade Engineered Plastics of Bristol, R.I. (material: J5000-G). The seals are spring-loaded O-ring seals, such as are available from Bal Seal Engineering, of Fort Ranch, Calif. Illustrative bushing dimensions for the larger piston are shown in Table 2.

TABLE 2

| | Larger Piston (FIG. 3) | |
|---|---|---|
| Dimension | Value | Tolerance |
| A (outer diameter) | 0.500 | +/−0.001 |
| B (inner diameter) | 0.377 | +/−0.001 |
| C (diameter within notch) | 0.485 | +/−0.005 |
| D (length) | 0.850 | +/−0.01 |
| E (notch floor height) | 0.20 | +/−0.01 |
| F (notch height) | 0.15 | +/−0.01 |
| G (chamfer) | 45° × 0.010 | +/−0.5° |
| H (roughness) | 0.000032 | |

The use of precisely dimensioned pistons in connection with seals mounted in the pump block allows the cylinder bores to be defined with relatively loose tolerances, so that the block can be manufactured relatively inexpensively. In this embodiment, the pump block is made of acrylic, and the larger cylinder, the smaller cylinder, and the inlet and outlet channels are bored into the block. The block is screwed onto a two-part aluminum frame that also supports the actuation mechanism.

The pump 10 is capable of aspiring and expelling fluid, and it can use these capabilities to provide both a transfer mode and a dispensing mode. In its transfer mode, the pump can cause a probe on a moving arm to draw in samples or reagents and then expel them into a reaction vessel. In its dispensing mode, the pump can dispense dilution fluid from a supply line to the probe to dilute the reaction mixture or to clean the probe. Other modes, such as a reverse pumping mode, are also possible, but these modes are not currently used in the presently preferred embodiment.

Figure 6:
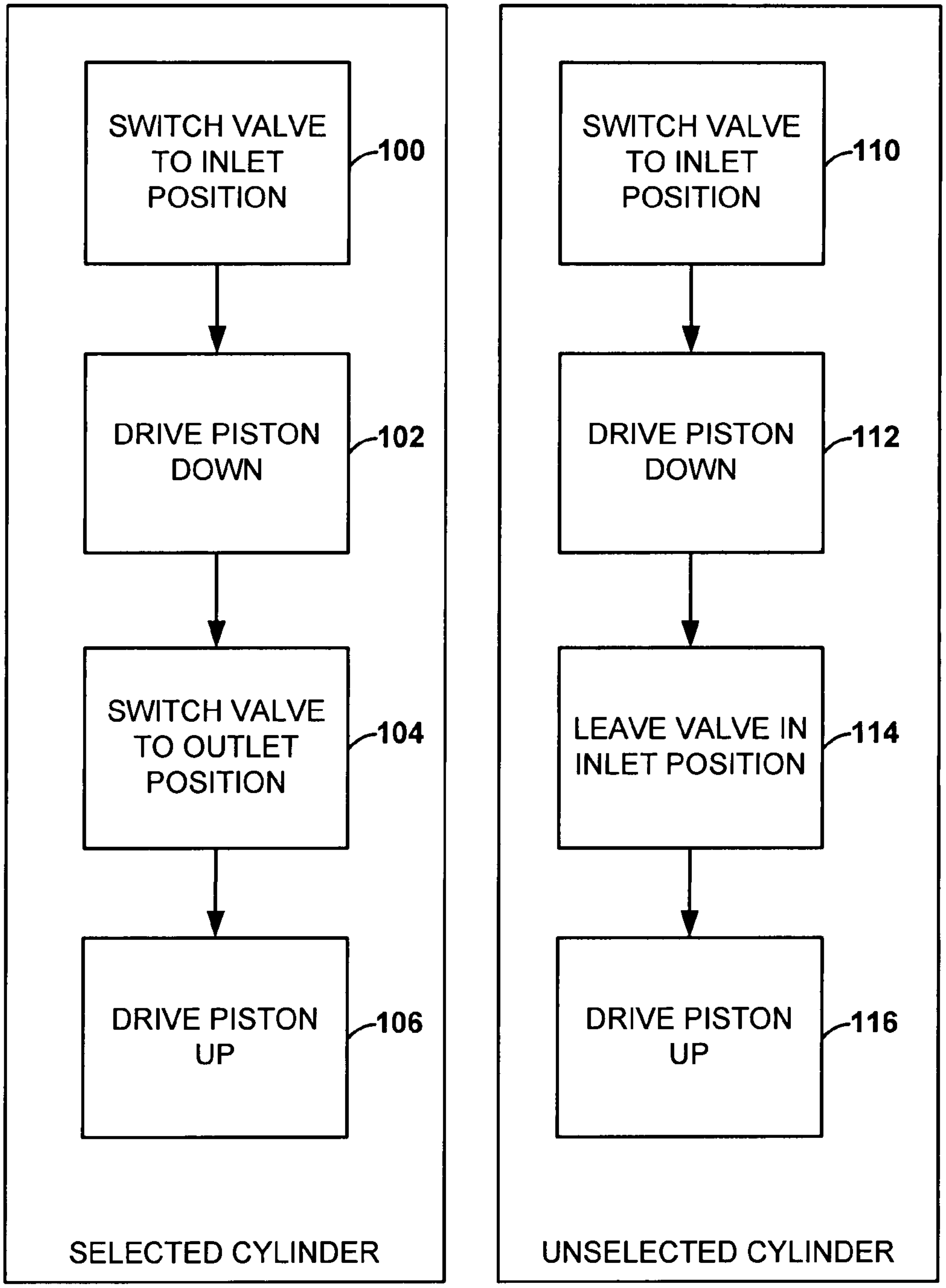
FIG. 6 is flowchart illustrating the operation of the diluter pump of FIG. 1 in dispensing mode.

Referring to FIG. 6, operation of the pump 10 in dispensing mode begins with the selection of a piston. The larger piston is used for metering larger quantities of fluids, and the smaller piston is used for metering smaller quantities. Both three-way valves are initially set to their inlet positions (step 100, 110), and the actuator is energized in a forward direction to pull the pistons away from the cylinder heads in their respective cylinders (step 102, 112) in an inlet stroke. Because the valves are both in the inlet position, both cylinders fill with diluter fluid from the supply line as the pistons descend.

The pistons end their descent when the desired quantity of diluent has been drawn into the selected part of the pump. The three-way valve of the selected cylinder is then switched from its inlet position to its outlet position (step 104), but the three-way valve of the unselected cylinder is left in its inlet position (step 114). The actuator can then be energized in reverse to cause the pistons to ascend in their respective cylinders in an outlet stroke (step 106, 116). During the outlet stroke, the selected cylinder dispenses the desired quantity of diluter fluid and the unselected cylinder dumps its charge back into the supply line.

Figure 7:
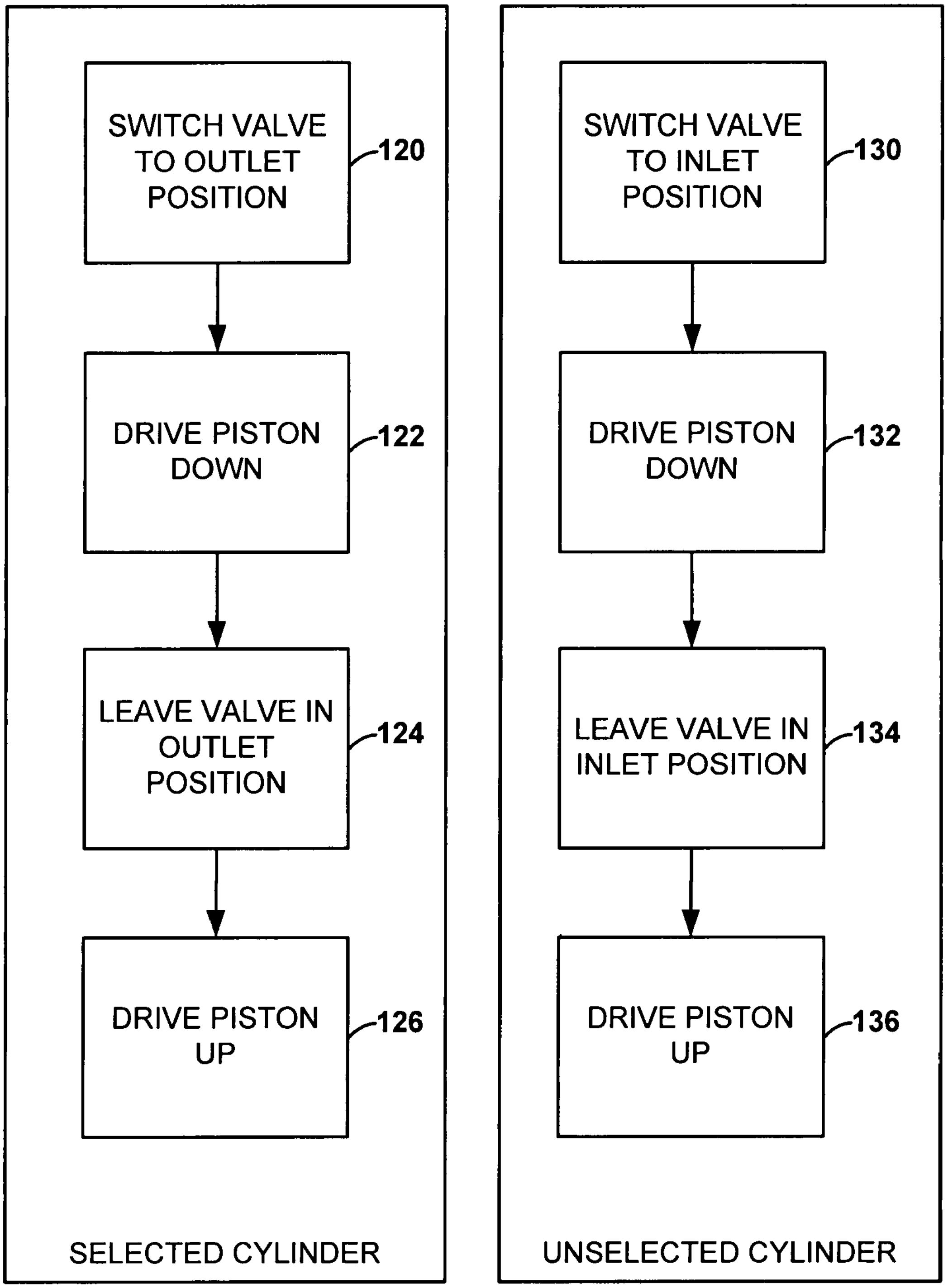
FIG. 7 is flowchart illustrating the operation of the diluter pump of FIG. 1 in transfer mode.

Referring to FIG. 7, operation of the pump 10 in transfer mode begins with the selection of a piston. The larger piston is used for metering larger quantities of fluids, and the smaller piston is used for metering smaller quantities. The selected valve is initially set to its outlet position (step 120) and the unselected valve is initially set to its inlet position (step 130). The actuator is energized in a forward direction to pull the pistons away from the cylinder heads in their respective cylinders (step 122, 132) in an aspiration stroke. Because the selected valve is in its outlet position, the selected cylinder aspires fluid into the pump. The unselected cylinder fills with diluter fluid from the supply line.

The pistons end their descent when the desired quantity of fluid has been aspirated by the selected part of the pump. The three-way valve of the selected cylinder is then left in its outlet position (step 124), the three-way valve of the unselected cylinder is left in its inlet position (step 134), and the actuator is energized in reverse to cause the pistons to ascend in their respective cylinders in an outlet stroke (step 126, 136). During the outlet stroke, the selected cylinder expels the fluid that was aspired during the aspiration stroke and the unselected cylinder dumps its charge back into the supply line.

The pump can use either one of the cylinders, or even both, to transfer or dispense fluid. These different modes of operation can be applied to different tasks in particular applications. In one embodiment in which the pump is used in a chemical analyzer, for example, the larger and smaller cylinders are used for different kinds of transfer tasks, the larger cylinder is used in dispensing mode for washing and dilution tasks, and the smaller cylinder is used only in a diagnostic dispensing mode to confirm that the pump is working properly. Overall, the sequencing methods described above allow fluid to be dispensed and transferred with just two relatively inexpensive three-way valves, but other types of valves and sequencing arrangements might also be suitable in some instances.

In this application the relative terms such as "above" and "below" have been used in a manner that is intended to refer to a reference orientation of the pump in which the compression chambers are located at the top of the pump. But in some instances the pump might be located in another position.

The present invention has now been described in connection with a number of specific embodiments thereof. However, numerous modifications which are contemplated as falling within the scope of the present invention should now be apparent to those skilled in the art. For example, the pistons could have portions with different cross sections at different distances from their heads, with an outer surface of a first of these portions interacting with a working surface of a respective bushing and an outer surface of a second of these portions interacting with a respective seal. It is therefore intended that the scope of the present invention be limited only by the scope of the claims appended hereto. In addition, the order of presentation of the claims should not be construed to limit the scope of any particular term in the claims.

What is claimed is:

1. A chemistry analyzer precision pump, including:

a) a pump block defining:

i) a first pump chamber having a fluid port at a first end, an opening for a first piston at a second end, a first bushing mount area, and a first seal mount located between the opening and the port, wherein the first pump chamber has a conical head defined by a first conic surface, ii) a second pump chamber having a fluid port at a first end, an opening for a second piston at a second end, a second bushing mount area, and a second seal mount located between the opening and the port, wherein the first pump chamber has a larger diameter than does the second pump chamber, and wherein the second pump chamber has a conical head defined by a second conic surface, b) a first O-ring seal mounted at the first seal mount, c) a second O-ring seal mounted at the second seal mount, d) a first ceramic piston mounted to reciprocate in the first pump chamber, past the first O-ring seal, wherein the first piston has a conical head defined by a third conic surface that has an aperture that is substantially the same as an aperture of the first conic surface, whereby the conical head of the first piston mates with the conical head of the first pump chamber at the top of its stroke, e) a second ceramic piston mounted to reciprocate in the second pump chamber, past the second O-ring seal, wherein the first piston has a larger diameter than does the second piston, wherein the second piston has a conical head defined by a fourth conic surface that has an aperture that is substantially the same as an aperture of the second conic surface, whereby the conical head of the second piston mates with the conical head of the second pump chamber at the top of its stroke, f) a canine that connects an end of the first ceramic piston to an end of the second ceramic piston, g) a first circular spring included in the first O-ring seal and positioned to bias the first seal against the first piston, h) a second circular spring included in the second O-ring seal and positioned to bias the second seal against the second piston, i) a first bushing mounted in the first bushing mount area to constrain motion of the first piston, wherein a length of the first bushing along the direction of motion of the first piston is longer than a diameter of the first piston where it constrains the first piston, and j) a second bushing mounted in the second bushing mount area to constrain motion of the second piston, wherein a length of the second bushing along the direction of motion of the second piston is longer than a diameter of the second piston where it constrains the second piston.

2. The apparatus of claim 1 wherein the first and second seals include a flouropolymer.

3. The apparatus of claim 2 wherein the first and second seals include polytetrafluoroethylene.

4. The apparatus of claim 1 wherein the first seal mount is defined at least in part by a portion of the pump block in the first pump chamber and centered around a longitudinal axis of the first pump chamber proximate its piston opening, and wherein the second seal mount is defined at least in part by a portion of the pump block in the second pump chamber and centered around a longitudinal axis of the second pump chamber proximate its piston opening.

5. The apparatus of claim 1 wherein the first and second pump chambers are parallel chambers defined in the pump block.

6. The apparatus of claim 1 wherein the pump block is made of plastic and wherein the pump chambers are defined by machined bores in the plastic pump block.

7. The apparatus of claim 6 wherein the pump block is made of polycarbonate or acrylonitrile butadiene styrene.

8. The apparatus of claim 1 wherein the pump block is at least partially transparent to visible light.

9. The apparatus of claim 1 further including a linear drive mechanism coupled to both the first and second pistons.

10. The apparatus of claim 9 wherein the linear drive mechanism includes a stepper motor and a lead screw.

11. The apparatus of claim 1 wherein the first piston has portions with different cross sections at different distances from its head and wherein an outer surface of a first of these portions interacts with a working surface of the first bushing and an outer surface of a second of these portions interacts with the first seal, and wherein the second piston has portions with different cross sections at different distances from its head and wherein an outer surface of a first of these portions interacts with a working surface of the second bushing and an outer surface of a second of these portions interacts with the second seal.

12. The apparatus of claim 1 wherein a bore of the first pump chamber is related to a bore of the second pump chamber by a ratio of about 4:1.

13. The apparatus of claim 1 further including a first intake three-way solenoid valve having a first common port hydraulically connected to a first fluid outlet at a peak of the first pump chamber, a first fluid inlet port for receiving fluid, and a first fluid outlet port for delivering the fluid; and further including a second intake three-way solenoid valve having a second common port hydraulically connected to a second fluid outlet at a peak of the second pump chamber, a second fluid inlet port for receiving the fluid, and a second fluid outlet port for delivering the fluid.

14. A chemistry analyzer precision pumping method, including:

setting a first three-way solenoid valve to an inlet position, setting a second three-way solenoid valve to an inlet position, pulling a first piston away from a cylinder head in a first pump chamber, while the first three-way solenoid valve is in its inlet position to draw fluid through the first solenoid valve into the first pump chamber, pulling a second piston away from a cylinder head in a second pump chamber while the second three-way solenoid valve is in its inlet position to draw fluid through the second solenoid valve into the second pump chamber, wherein the steps of pulling the first and second pistons occur simultaneously, wherein the first piston has a larger diameter than the second piston, and wherein the first pump chamber has a larger diameter than the second pump chamber, a dispensing selection step that includes selectively setting one of the first and second three-way solenoid valves to an outlet position, while the other of the first and second three-way solenoid valves is set in the inlet position, simultaneously pushing both the first piston toward the cylinder head in the first pump chamber and the second piston toward the cylinder head in the second pump chamber after the dispensing selection step, whereby fluid is selectively dispensed from one of the first and second pump chambers based on the dispensing selection step, a transfer selection step that includes selectively setting one of the first and second three-way solenoid valves to the outlet position, while the other of the first and second three-way solenoid valves is set in the inlet position, simultaneously pulling both the first piston away from the cylinder head in the first pump chamber and the second piston away from the cylinder head in the second pump chamber after the transfer selection step, pushing the piston corresponding to the three-way solenoid valve set to the outlet position in the transfer selection step toward its cylinder head in its pump chamber while the three-way solenoid valve selected in the transfer selection step is in its outlet position, and pushing the piston corresponding to the three-way solenoid valve set to the inlet position in the transfer selection step toward its cylinder head in its pump chamber while the three-way solenoid valve selected in the transfer selection step is in its inlet position, wherein the steps of pushing the first and second pistons occur simultaneously and whereby fluid is selectively transferred by one of the first and second pump chambers based on the transfer selection step.

15. The apparatus of claim 1 wherein first and second pistons and the first and second pump chambers all have a circular right conical shape.

16. The method of claim 14 further including the steps of:

setting the first three-way solenoid valve to a first position, wherein the first position is one of the inlet and outlet positions, setting the second three-way solenoid valve to the same first position, pulling the first piston away from the cylinder head in the first pump chamber while the first three-way solenoid valve is in its first position to draw fluid through the first solenoid valve into the first pump chamber, pulling the second piston away from the cylinder head in the second pump chamber while the second three-way solenoid valve is in its first position to draw fluid through the second solenoid valve into the second pump chamber, wherein the steps of pulling the first and second pistons occur simultaneously, and simultaneously pushing both the first piston toward the cylinder head in the first pump chamber and the second piston toward the cylinder head in the second pump chamber while both the first and second solenoid valves are in a same position, whereby fluid is pumped by both of the first and second pump chambers.

* * * * *